(12) United States Patent
Clark et al.

(10) Patent No.: US 9,060,067 B2
(45) Date of Patent: Jun. 16, 2015

(54) METHOD, SYSTEM AND APPARATUS FOR PROVIDING CALLING NAME IDENTIFICATION

(75) Inventors: David William Clark, Carp (CA); Jonathan Allan Arsenault, Orleans (CA); Jeffrey William Dawson, Stittsville (CA); Eric John Wolf, Stittsville (CA)

(73) Assignee: BCE Inc., Montreal (CA)

( * ) Notice: Subject to any disclaimer, the term of this patent is extended or adjusted under 35 U.S.C. 154(b) by 1745 days.

(21) Appl. No.: 12/518,028

(22) PCT Filed: Dec. 8, 2006

(86) PCT No.: PCT/CA2006/001997
§ 371 (c)(1),
(2), (4) Date: Sep. 22, 2010

(87) PCT Pub. No.: WO2008/067631
PCT Pub. Date: Jun. 12, 2008

(65) Prior Publication Data
US 2011/0026700 A1    Feb. 3, 2011

(51) Int. Cl.
*H04M 1/56* (2006.01)
*H04M 1/57* (2006.01)
(Continued)

(52) U.S. Cl.
CPC .............. *H04M 1/57* (2013.01); *H04M 1/2535* (2013.01); *H04M 3/42059* (2013.01); *H04M 3/42068* (2013.01); *H04L 65/1069* (2013.01); *H04L 65/1073* (2013.01); *H04L 65/1096* (2013.01)

(58) Field of Classification Search
CPC ... H04M 1/57; H04M 3/42042; H04M 1/575; H04M 3/42068; H04M 15/06; H04M 2242/22; H04M 3/42093; H04M 3/42153; H04M 3/42034; H04M 3/4211; H04M 2203/6045; H04M 3/533; H04M 3/42059; H04M 1/663; H04M 3/493; H04M 15/38; H04M 15/00; H04M 1/576; H04M 3/428; H04M 1/573; H04M 1/723; H04M 7/006; H04Q 3/00; H04Q 2213/01; G06Q 10/109; H04L 29/06027

USPC ........ 379/142.01–142.15, 88.19, 88.2, 88.21, 379/93.03, 118, 120, 127.01, 127.06, 183, 379/201.11, 207.14, 207.15, 245; 370/352–356
See application file for complete search history.

(56) References Cited

U.S. PATENT DOCUMENTS 5,864,612 A     1/1999  Strauss et al.
6,038,305 A *   3/2000  McAllister et al. ...... 379/201.02
(Continued)

FOREIGN PATENT DOCUMENTS

WO        2006069212       6/2006
WO  PCT/CA2006/001997      4/2007

*Primary Examiner* — Akelaw Teshale
(74) *Attorney, Agent, or Firm* — Gowling Lafleur Henderson LLP

(57) ABSTRACT

Embodiments of the present invention are directed to a method, system and apparatus for providing customized calling identification. A method for providing customized calling identification comprises receiving a request for initiating an outgoing call from a communication client, the communication client being registered in association with a network address and being associated with a communication client identifier. The method further comprises, based on the communication client identifier, determining an auxiliary identifier associated with the communication client. The method further comprises augmenting the request for initiating an outgoing call with the auxiliary identifier to generate an augmented request.

34 Claims, 7 Drawing Sheets

(51) Int. Cl.
*H04M 1/253* (2006.01)
*H04L 29/06* (2006.01)
*H04M 3/42* (2006.01)

(56) References Cited

U.S. PATENT DOCUMENTS

| | | | |
|---|---|---|---|
| 6,343,120 B1 | 1/2002 | Rhodes | |
| 6,421,437 B1 * | 7/2002 | Slutsman | 379/201.02 |
| 6,822,957 B1 * | 11/2004 | Schuster et al. | 370/389 |
| 8,730,941 B1 * | 5/2014 | Croak et al. | 370/352 |
| 2006/0034270 A1 * | 2/2006 | Haase et al. | 370/389 |
| 2006/0159060 A1 | 7/2006 | Fotta et al. | |
| 2006/0222166 A1 * | 10/2006 | Ramakrishna et al. | 379/265.09 |
| 2007/0127656 A1 * | 6/2007 | Citron et al. | 379/142.01 |
| 2007/0147356 A1 * | 6/2007 | Malas et al. | 370/356 |
| 2007/0153777 A1 * | 7/2007 | Coulas et al. | 370/356 |
| 2007/0263613 A1 * | 11/2007 | Hara et al. | 370/356 |

* cited by examiner

Fig. 2

| Client Mapping 200 | | | |
|---|---|---|---|
| Identifier 202 | Address 204 | Sub-address 206 | Auxiliary identifier 208 |
| 4162223333@serviceprovider.com | 64.230.200.100 | 110a$_1$ | <Bob Smith> |
| 4162223333@serviceprovider.com | 64.230.200.100 | 110a$_2$ | <default> |
| 4162223333@serviceprovider.com | 64.230.200.100 | 110a$_3$ | <Medical Office of Barbara Smith, MD> |
| 4165556666@serviceprovider.com | 64.230.200.101 | 5060 | <Reception> |
| 200n | | | |

200a
200b
200c
200d

METHOD, SYSTEM AND APPARATUS FOR PROVIDING CALLING NAME IDENTIFICATION

FIELD OF THE INVENTION

This invention relates to the field of telecommunications in general and, more specifically, to a method, system and apparatus for providing calling name identification.

BACKGROUND OF THE INVENTION

Caller Line Identification or, simply, CLID announcement is a telephony feature that provides a called party with information about a calling party associated with a given incoming call to enable the called party to decide how to dispose of the given incoming call (such as, for example, answer the given incoming call, ignore the given incoming call, etc). Generally speaking, two flavours of the CLID announcement features are known in the art. Within a first CLID announcement feature, the CLID comprises a telephone number (or another identifier) associated with the called party. Within a second CLID announcement feature, commonly referred to as Enhanced CLID, the Enhanced CLID comprises the telephone number, as well as a billing (or subscribing) name. An indication of the billing name can be transmitted as part of a signalling message or can be obtained from a Line Information Data Base (LIDB) based on the telephone number which is transmitted as part of the signalling message. By ascertaining the telephone number and/or the name associated with the calling party, the called party may decide how she or he would like to handle the given incoming call.

However, the ability of the Enhanced CLID announcement solutions to provide additional information (i.e. the name of the calling party) increases the risk that misleading information is transmitted to the called party. For example, a particular call may be originated from an originating communication device which can be used by more than one person. If the person originating the particular call is not the same as the person subscribing to telephony service at the originating communication device, the called party may be misinformed as to who the true originator of the particular call is.

Therefore, the prior art solutions appear to lack means for identifying the name of the actual caller instead of the name of the subscriber. Such a function would be of benefit to both the calling party and the called party, as the called party will be in a better position to ascertain the true identity of the calling party and the calling party will more likely to be able to complete the call.

SUMMARY OF THE INVENTION

According to a first broad aspect of the present invention, there is provided a method. The method comprises receiving a request for initiating an outgoing call from a communication client, the communication client being registered in association with a network address and being associated with a communication client identifier. The method further comprises, based on the communication client identifier, determining an auxiliary identifier associated with the communication client. The method further comprises augmenting the request for initiating an outgoing call with the auxiliary identifier to generate an augmented request.

According to a second broad aspect of the present invention, there is provided an apparatus. The apparatus comprises means for receiving a request for initiating an outgoing call from a communication client, the communication client being registered in association with a network address and being associated with a communication client identifier. The apparatus further comprises means for determining an auxiliary identifier associated with the communication client based on the communication client identifier. The apparatus further comprises means for augmenting the request for initiating an outgoing call with the auxiliary identifier to generate an augmented request.

According to a third broad aspect of the present invention, there is provided a system. The system comprises a network element operable to receive a request for initiating an outgoing call from a communication client, the communication client being registered in association with a network address and being associated with a communication client identifier. The network element is further operable, based on the communication client identifier, to determine an auxiliary identifier associated with the communication client and to augment the request for initiating an outgoing call with the auxiliary identifier to generate an augmented request.

According to yet another broad aspect of the present invention, there is provided a computer-readable medium. The computer-readable medium comprising computer-readable program code which, when executed by a computing apparatus, causes the computing apparatus:

to receive a request for initiating an outgoing call from a communication client, the communication client being registered in association with a network address and being associated with a communication client identifier;

based on the communication client identifier, to determine an auxiliary identifier associated with the communication client;

to augment the request for initiating an outgoing call with the auxiliary identifier to generate an augmented request.

These and other aspects and features of the present invention will now become apparent to those skilled in the art upon review of the following description of specific embodiments of the invention in conjunction with the accompanying drawings.

BRIEF DESCRIPTION OF THE DRAWINGS

Embodiments of the present invention are described with reference to the following figures, in which:

FIG. 2 is a diagram representing a non-limiting embodiment of a client mapping maintained by a network element of FIG. 1;

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
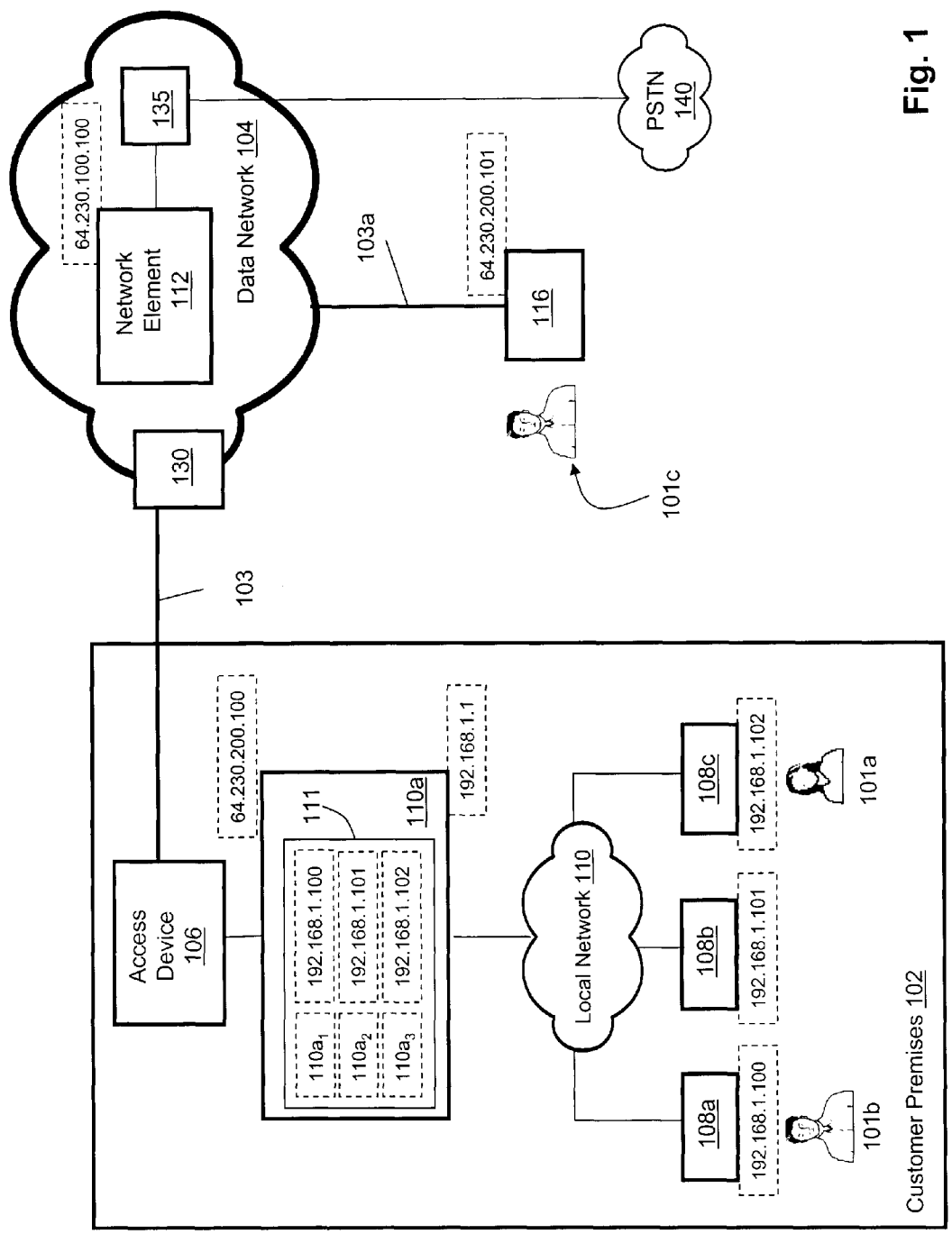
FIG. 1 is a diagram representing various components of a non-limiting embodiment of an infrastructure for providing customized calling name identification.

FIG. 1 shows various components of an infrastructure for providing customized calling name identification. The infrastructure comprises a customer premises 102 associated with a user 101a. The customer premises 102 may be further associated with a user 101b residing thereat. For the purposes of the example to be presented herein below, it is to be assumed that the user 101a is a subscriber to a telephony service at the customer premises 102. Accordingly, the user 101a represents a "registered subscriber" associated with the customer premises 102. The customer premises 102 can be coupled to a data network 104 via an access connection 103. The customer premises 102 may comprise, but is not limited to, a house, a unit in a multi-dwelling unit (MDU), an office, etc. The data network 104 may comprise any data network suitable for satisfying communication needs of user(s) at the customer premises 102 (such as, for example, the users 101a, 101b). These communication needs may include exchanging data, entertainment, telephony and the like. In a specific non-limiting embodiment of the present invention, the data network 104 can comprise the Internet. However, in alternative non-limiting embodiments of the present invention, the data network 104 may comprise another type of a public data network, a private data network, portions of the Public Switched Telephone Network (PSTN), a wireless data network and the like.

In an example non-limiting embodiment of the present invention, the access connection 103 can be a copper twisted pair, over which higher-layer protocols allow for the exchange of packets (ex. an xDSL-based access link). In an alternative non-limiting embodiment, the access connection 103 may comprise an Ethernet link, a fiber optic link (e.g., Fiber-to-the-Premise, Fiber-to-the-Curb, etc.), a wireless link (e.g., EV-DO, Wi-Max, Wi-Fi, CDMA, TDMA, GSM, UMTS, and the like), coaxial cable link, etc., or a combination thereof. Generally speaking, the access connection 103 may comprise any type of wireless, wired or optical connection that allows exchange of data between the customer premises 102 and the data network 104.

It should be noted that even though its depiction in FIG. 1 is greatly simplified, the data network 104 may comprise a number of network elements for facilitating exchange of data. For example, in the above-mentioned scenario where the access connection 103 is the xDSL-based link, the data network 104 may comprise a number of Digital Subscriber Line Access Multiplexers (DSLAMs), Outside Plant Interface DSLAMs (OPI-DSLAMs), edge routers, etc. In the above-mentioned scenario where the access connection 103 is the cable link, the data network 104 may comprise a number of cable headends, distribution hubs, etc. As a non-limiting example of these network elements, a DSLAM 130 has been depicted in FIG. 1. Persons skilled in the art will readily appreciate various configurations possible for the network elements that make up the data network 104 and, as such, these network elements need not be described here in great detail.

The customer premises 102 may comprise an access device 106 that facilitates exchange of data with the data network 104 via the access connection 103. In some embodiments of the present invention, the access device 106 may comprise a modem. Examples of modems that can be used include, but are not limited to, a cable modem, an xDSL modem and the like. In alternative embodiments of the present invention, which are particularly applicable where the access connection 103 comprises Fiber-to-the-premise, the access device 106 may comprise an Optical Network Terminal (ONT). Naturally, the type of the access device 106 will depend on the type of the access connection 103 employed.

The customer premises 102 may comprise a number of communication clients coupled to the access device 106. Only three communication clients are depicted: a communication client 108a, a communication client 108b and a communication client 108c. Generally speaking, communication clients 108a, 108b and 108c can be implemented in hardware, software, firmware or a combination thereof. In a specific non-limiting example to be presented herein below, the communication client 108a may comprise a VoIP phone, the communication client 108b may comprise a second VoIP phone and the communication client 108c may comprise a computing apparatus executing a soft client for handling VoIP calls. For the purposes of various examples to be presented herein below, the following non-limiting assumptions will be made:

the communication client 108a comprises the VoIP phone located in a bedroom associated with the user 101b and, as such, outgoing calls originated by the communication client 108a are likely to be originated by the user 101b;

the communication client 108b comprises the VoIP phone located in a family room of the customer premises 102 and, as such, outgoing calls originated by the communication client 108b can be originated by either the user 101a or the user 101b (or any other users potentially residing at the customer premises 102);

the communication client 108c comprises the computing apparatus executing a soft client located in a home office of the customer premises 102, the home office associated with the user 101a who runs her business from the customer premises 102 and, as such, outgoing calls originated by the communication client 108c are likely to be originated by the user 101a.

It should be understood that the customer premises 102 may comprise a number of additional communication clients that may include, but are not limited to, other VoIP phones, a wireless VoIP phone (such as, for example, a J2ME wireless phone), a Plain Old Telephone System (POTS) phone equipped with an Analog Terminal Adapter (ATA), other computing apparatuses executing soft clients, a set-top box, a gaming device, a security system and the like. The number of communication clients installed within the customer premises 102 is not limited other than by business considerations of a service provider who manages the access connection 103. Put another way, the customer premises 102 may comprise two or more communication clients similar to the communication clients 108a, 108b, 108c.

In some embodiments of the present invention, some of the communication clients located at the customer premises 102 may be connected to a communication network different from the data network 104, such as the Public Switched Telephone Network, a wireless communication network, etc.

In some embodiments of the present invention, the communication clients 108a, 108b and 108c may be coupled directly to the access device 106. However, in the specific non-limiting embodiment depicted in FIG. 1, the communication clients 108a, 108b and 108c are coupled to the access device 106 via a local data network 110. In some non-limiting embodiments of the present invention, the local data network 110 may comprise an Ethernet-based network. In another non-limiting embodiment of the present invention, the local data network 110 may comprise a wireless network (ex. a Wi-Fi based network, a Wi-Max based network, BlueTooth® based network and the like). It should be noted that any other type of local data network 110 or a combination of the example networks can be used. In some of these embodiments, the local data network 110 may comprise a home gateway 110a that mediates communication between the communication clients 108a, 108b and 108c and the access device 106. The home gateway 110a may comprise a wireless router, a wired router or a combined wireless/wired router.

In some non-limiting embodiments of the present invention, the functionality of the access device 106 and the home gateway 110a may be embodied in a single device. In other non-limiting embodiments of the present invention, the functionality of the access device 106 and/or the home gateway 110a may be integrated into one of the communication clients 108a, 108b, 108c. In yet further alternative non-limiting embodiments of the present invention, the home gateway 110a and the local data network 110 can be omitted from the infrastructure of FIG. 1. This is particularly applicable in those non-limiting embodiments where the communication clients 108a, 108b or 108c are coupled to the access device 106 directly and, as such, the local data network 110 and the home gateway 110a can be omitted. Yet in other alternative non-limiting embodiments of the present invention, some of the communication clients 108a, 108b and 108c (as well as other communication clients potentially located within the customer premises 102, but omitted from the infrastructure of FIG. 1 for the sake of simplicity) may be coupled directly to the access device 106, while others of the communication clients 108a, 108b and 108c (as well as other communication clients potentially located within the customer premises 102, but omitted from the infrastructure of FIG. 1 for the sake of simplicity) may be coupled to the access device 106 via the local data network 110 and the home gateway 110a.

It should be understood that the infrastructure of FIG. 1 may comprise a number of additional communication clients outside of the customer premises 102, coupled to the data network 104. As a non-limiting example only, the infrastructure of FIG. 1 may comprise a communication client 116 associated with another user (such as, for example, a user 101c). The communication client 116 can be coupled to the data network 104 via an access connection 103a. The communication client 116 may comprise one or more of a VoIP phone, a POTS phone equipped with an Analog Terminal Adapter (ATA), a computing apparatus executing a soft client, a set-top box, a gaming device, a security system and the like. The access connection 103a may be substantially similar to the access connection 103. However, it should be understood that the access connection 103 and the access connection 103a need not be of the same type in every embodiment of the present invention. For example, in some non-limiting embodiments of the present invention, the access connection 103 may comprise an xDSL-based link, while the access connection 103a may comprise a Fiber-to-the-Premise based link. Naturally, a myriad of other non-limiting combinations of how the access connections 103, 103a can be implemented are possible.

For the purposes of establishing communication sessions and terminating communication sessions between, for example, one of the communication clients 108a, 108b, 108c and another communication client (such as, for example, the communication client 116) via the data network 104, the data network 104 may comprise a network element 112. In some embodiments of the present invention, the network element 112 can comprise an apparatus sometimes referred to in the industry as a "soft switch" and that comprises circuitry, software and/or control logic for providing various communication features to VoIP clients (such as, for example, the VoIP clients 108a, 108b, 108c and 116) coupled to the data network 104. Examples of such communication features include (i) connecting incoming calls to the communication clients (such as, for example, the communication clients 108a, 108b, 108c and 116); and (ii) handling outgoing calls originated from the communication clients (such as, for example, the communication clients 108a, 108b, 108c and 116). Other examples of communication features that can be performed by the network element 112 can include but are not limited to call waiting, call forwarding, and so on. Persons skilled in the art will appreciate that the network element 112 may have other configurations.

In some embodiments of the present invention, the network element 112 may further comprise circuitry, software and/or control logic for performing at least one of the following functions: synthesizing voice messages, providing audio mixing capabilities, receiving a selection from users of communication clients, receiving and interpreting speech utterances, detecting DTMF tones, determining the current time and the like. In an alternative non-limiting embodiment of the present invention, some or all of these additional functions may be performed by one or more devices (not depicted) connected to and under control of the network element 112. Furthermore, among other functions performed by the network element 112, the network element 112 can maintain an active call table (not depicted) which logs all active communication sessions maintained by all communication clients registered to the network element 112 (such as, for example, the communication clients 108a, 108b, 108c and 116).

In addition, the network element 112 can comprise suitable circuitry, software and/or control logic for exchanging calls with entities outside the data network 104. This is particularly convenient, when a call is placed by the user of one of the communication clients that the network element 112 serves (i.e. a user 101a of one of the communication clients 108a, 108b, and 108c or the user 101c of the communication client 116) to a telephone number that is reachable only via the Public Switched Telephone Network (PSTN), which is depicted at 140 in FIG. 1 or via or a wireless communication network. In an alternative non-limiting embodiment of the present invention, the infrastructure of FIG. 1 may comprise a separate gateway 135 for mediating the communication flow between the data network 104 and the PSTN 140.

A non-limiting example of the network element 112 can be embodied in a MCS 5200 Soft Switch manufactured by Nortel Networks Ltd. of 8200 Dixie Road, Brampton, Ontario L6T 5P6, Canada. However, it should be expressly understood that the network element 112 can have various other configurations.

For the purposes of facilitating exchange of data via the data network 104, the home gateway 110a may be assigned a network address compatible with an addressing scheme of the data network 104. In some embodiments of the present inventions, the network address can comprise an IPv4 address. In an alternative embodiment of the present invention, the network address can comprise an IPv6 address. In an alternative non-limiting embodiment of the present invention, the network address can comprise any other suitable type of a unique identifier, such as, for example, a media access control (MAC) address, a proprietary identifier and the like.

How the home gateway 110a is assigned the network address is not particularly limited. For example, in some non-limiting embodiments of the present invention, the home gateway 110a may be assigned a static network address. This static network address may be assigned to the home gateway 110a before the home gateway 110a is shipped to the customer premises 102, during an initial registration process or at another suitable time. In another non-limiting embodiment of the present invention, the home gateway 110a may be assigned a dynamic network address. For example, in a non-limiting scenario, a Dynamic Host Configuration Protocol (DHCP) server (not depicted) may be used to assign the dynamic network address (such as, for example, a dynamic IP address) to the home gateway 110a. In alternative non-limiting embodiments of the present invention, the home gateway 110a can obtain its network address by establishing a PPPoE session with a provisioning server (not depicted). Other alternative implementations are, of course, possible. In an alternative non-limiting embodiment of the present invention, which is particularly applicable in a scenario where the home gateway 110a is omitted, the access device 106 may be assigned a network address.

Each of the communication clients 108a, 108b and 108c can also be assigned a respective network address for the purposes of receiving and transmitting data via the home gateway 110a, the access device 106 and the data network 104. Several non-limiting embodiments as to how the network addresses of the communication clients 108a, 108b and 108c can be assigned are envisioned:

Public Network Addresses

In some embodiments of the present invention, the communication clients 108a, 108b and 108c can be assigned network addresses that are routable or, in other words, are visible to the data network 104 and other devices connected thereto (such as, for example, the network element 112, the communication client 116). The routable network addresses are sometimes also referred to as "global" or "public" network addresses. For example, if the data network 104 implements an IPv6 address scheme, it is envisioned that each of the communication clients 108a, 108b and 108c may be assigned a unique public IP address. In some of these non-limiting embodiments, there may be no need for the local data network 110 and/or the home gateway 110a.

Private Network Addresses

In other embodiments of the present invention, each of the communication clients 108a, 108b and 108c can be assigned what is called a "non-routable", "local" or "private" network address. In these non-limiting embodiments, the private network addresses are used for the purposes of identifying the communication clients 108a, 108b and 108c within the local data network 110, while communication outside of the local data network 110 is implemented by using the aforementioned public network address assigned to the home gateway 110a (or, in some cases, the access device 106). In some non-limiting embodiments of the present invention, the home gateway 110a may be responsible for assigning private network addresses to the communication clients 108a, 108b and 108c. However, this need not be the case in every embodiment of the present invention. For example, the private network addresses can be assigned to the communication clients 108a, 108b and 108c by a dedicated address server (not depicted) coupled to the local data network 110 or to the data network 104.

In the specific non-limiting example depicted in FIG. 1, each of the communication clients 108a, 108b and 108c can be assigned a private network address by the home gateway 110a. For the sole purpose of simplifying the description to be presented herein below, it is assumed that both the private and the public network addresses are Internet Protocol (IP) addresses assigned according to the IPv4 protocol. However, it is expected that one of ordinary skill in the art will easily adapt the teachings to be presented herein below to other addressing schemes.

Accordingly, the home gateway 110a may be assigned two IP addresses: a first IP address for the purposes of communicating with devices on the data network 104 (i.e. a so-called "network facing interface" IP address) and a second IP address for the purposes of communicating with devices on the local data network 110 (i.e. a so-called "premise facing interface" IP address). For example, the network facing interface IP address may comprise a public IP address "64.230.200.100". The assignment of this public IP address can be done by the aforementioned DHCP server (not depicted) coupled to the data network 104. The premise facing interface IP address may comprise a private IP address "192.168.1.1".

The home gateway 110a can be responsible for assigning private IP addresses to the communication clients 108a, 108b and 108c. For example, the communication client 108a may be assigned a private IP address "192.168.1.100", the communication client 108b may be assigned a private IP address "192.168.1.101" and the communication client 108c may be assigned a private IP address "192.168.1.102".

As one skilled in the art will appreciate, in the specific embodiment depicted in FIG. 1, the private IP addresses assigned to the communication clients 108a, 108b and 108c, as well as the private IP address assigned to the premise facing interface of the home gateway 110a, are only routable within the local data network 110, while the public IP address assigned to the network facing interface of the home gateway 110a is routable within the data network 104. Accordingly, in order to facilitate exchange of data between the communication clients 108a, 108b and 108c and the data network 104, the home gateway 110a can be operable to implement a Network Address Translation (NAT) operation or, in other words, to translate the private IP addresses assigned to the communication clients 108a, 108b and 108c for the purposes of routing data packets to/from the communication clients 108a, 108b and 108c using the public IP address assigned to the home gateway 110a.

NAT operation is known to those of skill in the art and, as such, no detailed description of the process will be presented here. However, for the benefit of the reader a brief overview will be presented. The home gateway 110a can be operable to receive a packet from one of the communication clients 108a, 108b and 108c (i.e. an outgoing packet). The home gateway 110a performs a NAT operation whereby a source address of the received outgoing packet (which in this non-limiting example can be the private IP address of one of the communication clients 108a, 108b and 108c that originated the outgoing packet) is substituted with the network facing interface IP address associated with the home gateway 110a and a port number that uniquely identifies one of the communication clients 108a, 108b, 108c which originated the outgoing packet. The home gateway 110a can further be operable to compile an internal mapping table 111. The internal mapping table 111 correlates at least (i) an original source address (i.e. the private IP address of one of the communication clients 108a, 108b, 108c that has originated the outgoing packet) to (ii) a port number assigned to the respective one of the communication clients 108a, 108b, 108c. In the specific non-limiting example of FIG. 1, the internal mapping table 111 correlates the private IP address of the communication client 108a (i.e. 192.168.1.100) to a port $110a_1$, the private IP address of the communication client 108b (i.e. 192.168.1.101) to a port $110a_2$, and the private IP address of the communication client 108c (i.e. 192.168.1.102) to a port $110a_3$. Data maintained within the internal mapping table 111 can allow the home gateway 110a to receive a packet destined for one of the communication clients 108a, 108b, 108c (i.e. an incoming packet addressed using the network facing interface IP address associated with the home gateway 110a and a port number associated with the one of the communication clients 108a, 108b, 108c to which the incoming packet is destined for) and using the internal mapping table 111, the home gateway 110a can route the incoming packet to the intended destination (i.e. one of the communication clients 108a, 108b, 108c). The home gateway 110a, thereby, allows for two-way exchange of packets between one or more of the communication clients 108a, 108b and 108c with any other device on the data network 104 (such as, for example, the communication client 116). It should be noted that in an alternative non-limiting embodiment of the present invention, the internal mapping table 111 can be maintained by another device accessible to the home gateway 110a.

In a similar manner, the communication client 116 may be associated with a network address. As a non-limiting example that is presented in FIG. 1, the communication client 116 can be directly coupled to the data network 104 without the use of a home gateway. This is particularly applicable in those embodiments, where the communication client 116 is embodied in a soft client executed on a computing apparatus, for example. In a non-limiting example, communication client 116 may be associated with an IP address "64.230.200.101", which may be a public IP address or, in other words, an IP address routable within the data network 104. For the purposes of a non-limiting illustration to be presented herein, it is assumed that the communication client 116 is coupled directly to the access connection 103a and, as such, exchange of data with the data network 104 can be performed without the need for any port number mapping.

For the purposes of exchanging data and, more specifically, for the purposes of establishing a communication session (such as, for example, a VoIP call) between two or more of the communication clients 108a, 108b, 108c and 116 (as well as potentially other communication clients), a registration process executed at the network element 112 can be implemented. For the sole purpose of simplifying the description to be presented herein below, an example of the communication session being a VoIP call will be used. However, it should be expressly understood that the type of communication sessions or the data exchanged between the communication clients 108a, 108b, 108c and 116 is not particularly limited and may include a video call, an instant messaging session or a multimedia session, to name just a few possibilities.

Before describing the registration process in detail, a client mapping 200 will now be described in greater detail with reference to FIG. 2. The client mapping 200 can be maintained by the network element 112 of FIG. 1 for the purposes of facilitating establishing of communication sessions between the communication clients 108a, 108b, 108c, 116 via the data network 104. The network element can maintain the client mapping 200 in an internal database or in a separate database (not depicted) accessible to and under control of the network element 112.

The mapping 200 may maintain a plurality of records, such as records 200a, 200b, 200c and 200d. Each of the records 200a, 200b, 200c and 200d may maintain information about registered communication clients, such as for example, communication clients 108a, 108b, 108c and 116. Each of the records 200a, 200b, 200c and 200d may maintain a relationship between an identifier 202, an address 204 and a sub-address 206. Each of the records 200a, 200b, 200c, 200d can further map the identifier 202 to an auxiliary identifier 208.

In a specific non-limiting embodiment, the identifier 202 may comprise an alias or another identifier of a user (such as one of the users 101a, 101b) to which a particular communication client is registered. Some non-limiting examples of the identifier 202 include, but are not limited to, a user account, a proprietary identifier, a network address and the like. In the specific non-limiting embodiment to be presented herein below, the identifier 202 comprises a Session Initiation Protocol (SIP) Universal Resource Identifier (URI) address assigned on a per user account basis or, in other words, all communication clients registered to the same user account are associated with the same identifier 202. Typically, all the communication clients registered to the same user account are said to be associated with the same user, but this need not be so in every embodiment of the present invention. For example, in an alternative non-limiting embodiment of the present invention, which is particularly applicable where the customer premises 102 comprises an office and where the subscriber to the communication service (i.e. a company) and the user of the communication client(s) (i.e. an employee) are different, the communication clients can be registered to the same user account associated with the company and may be used by various employees of that company. For the avoidance of doubt, it should be expressly understood that the user account can be associated with the user 101a, as well as other users at the customer premises 102.

The address 204 may comprise an indication of a public network address associated with an endpoint where the communication client is located (such as, for example, the customer premises 102), such as, for example, an IP address, a proprietary network identifier, etc. The sub-address 206 may contain an identifier that may be used to uniquely identify a particular communication client within its local data network should this be the case (such as, for example, within the local data network 110 of the customer premises 102). For example, in the non-limiting example to be presented herein below, the sub-address 206 may comprise an indication of a port number of the home gateway 110a within the local data network 110 associated with a particular communication client.

In an alternative non-limiting embodiment of the present invention, the sub-address 206 may comprise another suitable identifier, such as, for example, a private IP address. In an alternative non-limiting embodiment of the present invention, the sub-address 206 may comprise a value which represents a value derived on the basis of the port number of the home gateway 110a. In yet further non-limiting embodiments of the present invention, the sub-address 206 may comprise an arbitrary value assigned by the home gateway 110a. In alternative embodiments of the present invention, which are particularly applicable where the communication clients 108a, 108b, 108c and 116 can be assigned a public network address, the sub-address 206 may comprise a default value or may be omitted. In the specific non-limiting example being presented herein, the communication client 116 may be associated with the public IP address and, as such, the sub-address 206 associated with the communication client 116 may be a default port value.

The data maintained in the identifier 202 is referred to sometimes herein below as a "user account identifier" and the data maintained in the address 204 and sub-address 206 is jointly referred to as a "communication client identifier". In some examples, as described above, the communication client identifier may only comprise the address 204.

The auxiliary identifier 208 may comprise an indication of an auxiliary name registered in association with the particular communication client. For example, the auxiliary identifier 208 may comprise an indication of a name of a user who is more likely to originate outgoing calls using the particular communication client. This could be a full name (ex. "John Smith"), a portion of the name (ex. "John" or "Mr. Smith") or an alias of the user (ex. "Happy Face"). Within these embodiments, the indication stored within the auxiliary identifier 208 may be used to more accurately identify who is the originator of the outgoing call originated from the particular communication client. In an alternative implementation of this invention, the auxiliary identifier 208 may comprise an indication of a location of the particular communication client (ex. "Living Room", "Kitchen", "XYZ Accounting Department", "XYZ Human Resources Department", etc.). Within these embodiments, the indication stored within the auxiliary identifier 208 may be used to more accurately identify the location of the particular communication client that is originating the outgoing call. As one skilled in the art will appreciate, knowing the location of the communication client originating the outgoing call may be useful in many circumstances, such as, for example in the case of an emergency for more precisely directing emergency response teams. Alternatively, knowing the location of the communication client originating the outgoing call may allow the called party to ascertain which part of the company the call is originated from, ex. Accounting, Human Resources, etc.

In another non-limiting embodiment of the present invention, the auxiliary identifier 208 may comprise privacy-related information, such as, for example "anonymous", "unknown", "name unavailable", etc. In yet further non-limiting embodiments of the present invention, the auxiliary identifier 208 may comprise an alternative telephone number associated with the user who is more likely to use the particular communication client to initiate outgoing calls, such as, for example, an alternative call back number, a telephone number associated with a wireless communication device, an e-mail address, etc or a combination thereof. Yet in further non-limiting embodiments of the present invention, the auxiliary identifier 208 may comprise a title of the person originating the call, a greeting, etc.

Data maintained within the auxiliary identifier 208 may be used in several ways. In some embodiments of the present invention, the data maintained within the auxiliary identifier 208 may be used to substitute a portion or entire CLID information associated with an outgoing call. In other embodiments of the present invention, the data maintained within the auxiliary identifier 208 may be transmitted in addition to the CLID information associated with an outgoing call. Other possible scenarios will be illustrated using examples to be presented herein below.

In some embodiments of the present invention, the indication of the auxiliary identifier 208 can be provided, for example, when the user 101a subscribes to the telephony services at the customer premises 102. Within this scenario, the user 101a may provide an indication of the auxiliary identifier 208 for each of the registered communication clients 108a, 108b, 108c. Naturally, the indication of the auxiliary identifier 208 for one or more of the communication clients 108a, 108b, 108c may be changed at a later time either by the user 101a, the user 101b or other users potentially residing within the customer premises 102.

In alternative non-limiting embodiments of the present invention, the provisioning of the indication of the auxiliary identifier 208 can be performed or changed at any other suitable time after the original service subscription. For example, when subscribing to the telephony service at the customer premises 102, the user 101a may only install the communication client 108b. At the same time, the user 101a may provide an indication of the auxiliary identifier 208 associated with the communication client 108b. At a certain point of time thereafter, the user 101a may connect another communication client (such as, for example, the communication client 108a). The user 101a may also provision an indication of the auxiliary identifier 208 associated with the communication client 108b. At the same time or at another time thereafter, the user 101a may connect another communication client (such as, for example, the communication client 108c). The user 101a may also provision an indication of the auxiliary identifier 208 associated with the communication client 108c.

How the user 101a provides the indication of the auxiliary identifier 208 is not particularly limited and some approaches may include, but are not limited to, calling a customer service representative, interacting with an interactive voice response system, accessing a provisioning web portal or web site, sending an electronic message, sending a short text message, sending an SMS message, sending an Instant Message and the like.

In the specific example being presented herein, the record 200a may be associated with the communication client 108a. As such, the identifier 202 of the record 200a may comprise an alias of the user 101a to whom the communication client 108a is registered or, in other words, who is the subscriber to communication services at the customer premises 102, such as, a SIP URI 4162223333@serviceprovider.com. It should be expressly understood that any other suitable form of the identifier 202 of the record 200a can be used, such as a numerical value, an alpha-numerical value, etc. The address 204 of the record 200a may comprise the public IP address associated with the home gateway 110a, which, in the specific non-limiting example being presented herein, is the public IP address "64.230.200.100". The sub-address 206 of the record 200a may comprise an indication of the port number of the home gateway 110a which is associated via the aforementioned internal mapping table 111 within the home gateway 110a with the communication client 108a or, in this non-limiting example, it may comprise "$110a_1$". The auxiliary identifier 208 of the record 200a may comprise "Bob Smith" indicative, for example, of the name of the user 108b who is more likely to use the communication client 108a to initiate outgoing calls.

In a similar manner, the record 200b can be associated with the communication client 108b. Since in the non-limiting example being presented herein, the communication client 108b is associated with the same customer premises 102 as the communication client 108a, then for the purposes of the non-limiting example to be presented herein below, it is assumed that the communication client 108b is to be registered with the same user 101a. Accordingly, the identifier 202 of the record 200b can comprise an alias of the user 101a who is the subscriber to communication services at the customer premises 102, such as, a SIP URI 4162223333@serviceprovider.com. It should be expressly understood that any other suitable form of the identifier 202 of the record 200b can be used, such as a numerical value, an alpha-numerical value, etc. The address 204 of the record 200b may comprise the public IP address associated with the home gateway 110a, which, in the specific non-limiting example being presented herein, is the public IP address "64.230.200.100". The sub-address 206 of the record 200b may comprise an indication of the port number of the home gateway 110a which is associated via the aforementioned internal mapping table 111 within the home gateway 110a with the communication client 108b or, in this non-limiting example, it may comprise "110$a_2$". The auxiliary identifier 208 of the record 200b may comprise "default" indicative, for example, that the communication client 108b is a shared device in the sense of more than one user (such as users 101a, 101b) can use the communication client 108b to initiate outgoing calls and, as such, the default registered subscriber name should be used.

The record 200c may be associated with the communication client 108c. Since in the non-limiting example being presented herein, the communication client 108c may be associated with the same user 101a as the communication clients 108a, 108b, then for the purposes of the non-limiting example to be presented herein below, it is assumed that the communication client 108c is to be registered with the same user 101a as the communication clients 108a, 108b. Accordingly, the identifier 202 of the record 200c can comprise an alias of the user 101a who is the subscriber to communication services at the customer premises 102, such as, a SIP URI 4162223333@serviceprovider.com. It should be expressly understood that any other suitable form of the identifier 202 of the record 200c can be used, such as a numerical value, an alpha-numerical value, etc. The address 204 of the record 200c may comprise the public IP address associated with the home gateway 110a, which, in the specific non-limiting example being presented herein, is the public IP address "64.230.200.100". The sub-address 206 of the record 200c may comprise an indication of the port number of the home gateway 110a which is associated via the aforementioned internal mapping table 111 within the home gateway 110a with the communication client 108c or, in this non-limiting example, it may comprise "110$a_3$". The auxiliary identifier 208 of the record 200c may comprise "Medical Office of Barbara Smith, MD" indicative, for example, of the name of the user 101a who is more likely to use the communication client 108c to initiate outgoing calls.

The record 200d may be associated with the communication client 116. The identifier 202 of the record 200d may comprise an alias of the user 101c to whom the communication client 116 is registered or, in other words, who is the subscriber to communication services at a location where the communication client 116 is located, such as, a SIP URI 4165556666@serviceprovider.com. It should be expressly understood that any other suitable form of the identifier 202 can be used, such as a numerical value, an alpha-numerical value, etc. The address 204 of the record 200d may comprise the public IP address associated with the communication client 116, which, in the specific non-limiting example being presented herein, is the public IP address "64.230.200.101". The sub-address 206 of the record 200d may comprise an indication of the default port used for exchanging data between the communication client 116 and the data network 104 or, in this non-limiting example, it may comprise the default port number "5060". In alternative embodiments of the present invention, the sub-address 206 can be left blank. In further embodiments of the present invention, when the exchanging of data is implemented using the default port, the sub-address 206 of the record 200d can be omitted altogether. The auxiliary identifier 208 of the record 200d may comprise "Reception" indicative of a location where the communication client 116 is located.

The client mapping 200 may maintain a number of additional records, jointly depicted at 200n. These additional records 200n may be associated with other communication clients of the infrastructure of FIG. 1, which have been omitted for the sake of simplicity.

How the client mapping 200 is populated is not particularly limited. In a specific non-limiting embodiment of the present invention, the client mapping 200 may be populated during a registration process of the communication clients 108a, 108b, 108c and 116 with the network element 112. Prior to describing the registration process, certain non-limiting assumptions will be made for the sole purpose of illustrating and providing an example for the description to be presented below.

Firstly, it is assumed that the communication clients 108a, 108b, 108c and 116 and the network element 112 implement a communication protocol for exchanging data therebetween. In a specific non-limiting embodiment of the present invention, the communication protocol may comprise Session Initiation Protocol (SIP). In an alternative non-limiting embodiment of the present invention, the communication protocol may comprise Simple Object Access Protocol (SOAP) or it may comprise ITU-T's H.323 signalling protocol. It should be expressly understood that any suitable communication protocol may be used, whether standards-based or proprietary. Some examples of the proprietary protocols that can be used include, but are not limited to, Unified Stimulus (UNISTIM) protocol, Mitel Networks Telephony Application Inter (MiTAI) protocol, Skiny, etc.

Secondly, it is assumed that each of the communication clients 108a, 108b, 108c and 116 is aware of the location of the network element 112 or, in other words, a network address associated with the network element 112. In some embodiments of the present invention, the network element 112 may be associated with a static network address, such as, but not limited to, a static IP address "64.230.100.100". In these embodiments of the present invention, the communication clients 108a, 108b, 108c and 116 may be pre-programmed with the static IP address of the network element 112. In an alternative embodiment of the present invention, the network element 112 may be associated with a Uniform Resource Locator (URL), such as, for example, "http://www.softswitch.serviceprovider.com". In these non-limiting embodiments of the present invention, the communication clients 108a, 108b, 108c and 116 may be pre-programmed with the URL of the network element 112. In yet further non-limiting embodiments of the present invention, the network element 112 may be associated with a dynamic network address, such as, for example, a dynamic IP address. In these non-limiting embodiments of the present invention, the communication clients 108a, 108b, 108c and 116 may discover the dynamic IP address of the network element 112 via an appropriate address discovery procedure, such as, for example, a Domain Name Service (DNS) look up. In some non-limiting embodiments of the present invention, the home gateway 110a or the access device 106 can be aware of the location of the network element 112 rather than the communication clients 108a, 108b, 108c. It should be noted that in alternative non-limiting embodiments of the present invention, the communication clients 108a, 108b, 108c may not be aware of the location of the network element 112. They may, instead, be aware of the location of another network element (such as, for example, a Session Border Controller, a proxy server, etc.).

Figure 3:
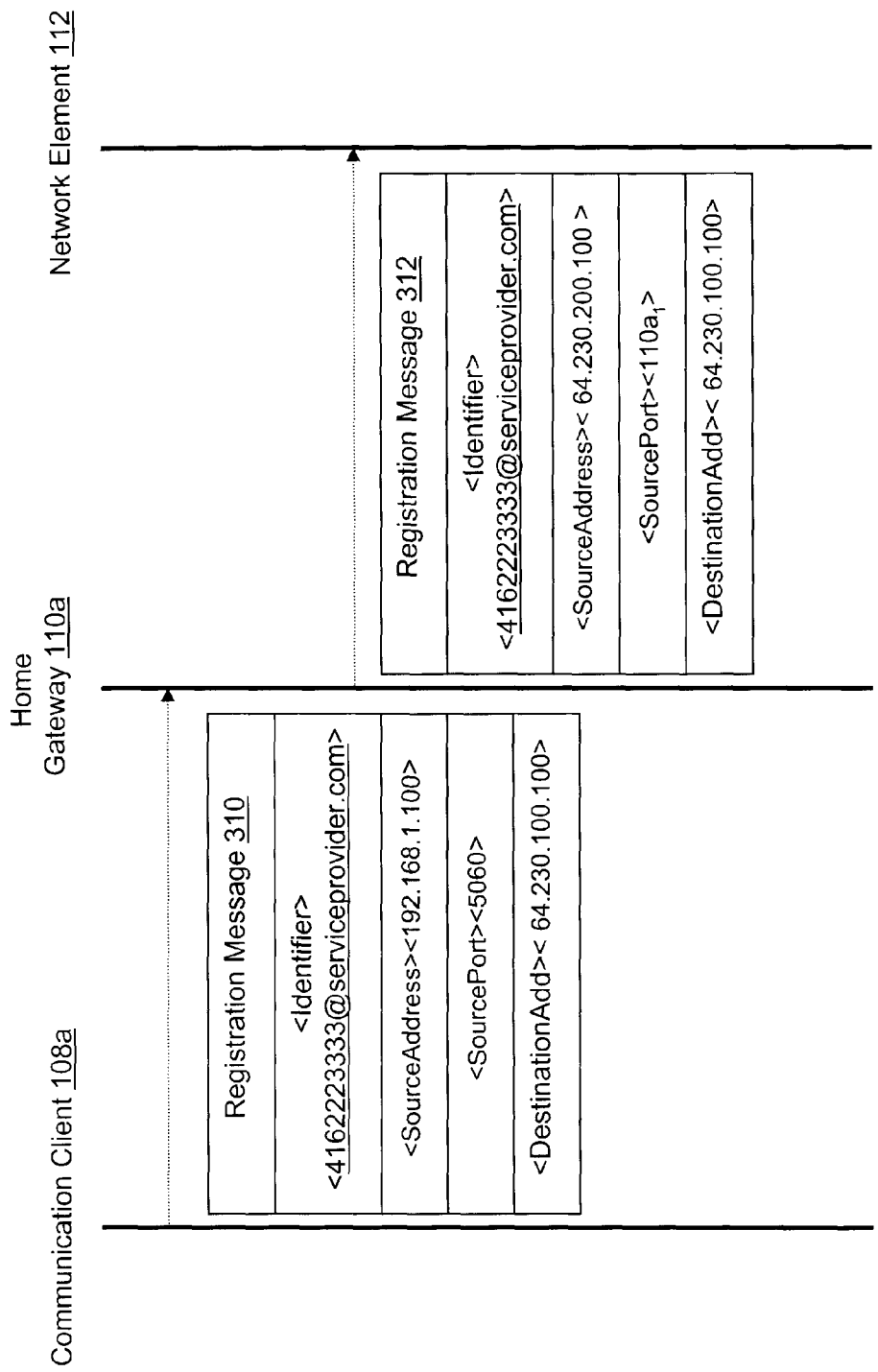
FIG. 3 is a signal flow diagram depicting a non-limiting embodiment of a flow of signals exchanged between a communication client and the network element of FIG. 1 during a registration process.

Having made these non-limiting assumptions, a registration process by virtue of which the communication clients 108a, 108b, 108c and 116 can register with the network element 112 will now be described in greater detail. With reference to FIG. 3, an example of how the communication client 108a can register with the network element 112 will now be described. In some non-limiting embodiments of the present invention, the communication client 108a may perform the registration process, when the communication client 108a is powered on for the first time. In an alternative non-limiting embodiment of the present invention, the communication client 108a may perform the registration process after being unplugged and moved to a new location. In yet further non-limiting embodiments of the present invention, the communication client 108a can perform the registration process on-demand, for example, when triggered by the user 101a, by an application executed on the communication client 108a or by an application executed on another device in the customer premises 102 or connected to the data network 104. For example, each of the records 200a-200n may be assigned an "expiry" indicator. The expiry indicator can be set by the network element 112, it can be requested by the communication client submitting a registration request or it can comprise a default value (ex. 3600 seconds or the like). When the "expiry" indicator expires or shortly thereafter, the network element 112 may cause the respective communication client associated with the expired record 200a-200n to re-execute the registration process.

It should be noted that in alternative non-limiting embodiments of the present invention, a service provider who is responsible for managing the network element 112 can pre-provision the client mapping 200. Within these embodiments of the present invention, the registration process can be omitted. This scenario is particularly applicable in those non-limiting embodiments of the present invention, where the communication clients 108a, 108b, 108c, 116 are assigned a static network address.

It should be noted that in some non-limiting embodiments of the present invention, each of the communication clients 108a, 108b, 108c and 116 may be aware of its respective identifier 202. How the communication clients 108a, 108b, 108c and 116 may become aware of their respective identifiers 202 is not particularly limited. In some embodiments of the present invention, an indication of the identifier 202 may be programmed into the communication clients 108a, 108b, 108c and 116 before they are dispatched to the respective users 101a, 101b. However, in alternative non-limiting embodiments of the present invention, the indication of the identifier 202 can be inputted by the respective user 101a, 101b during the registration process. In an alternative non-limiting embodiment of the present invention, the indication of the identifier 202 can be determined by the communication client 108a by interacting with the home gateway 110a or with the access device 106. For the purposes of the non-limiting example to be presented herein below, it is assumed that the user 101a has inputted the indication of the identifier 202 (i.e. 4162223333@serviceprovider.com) into the communication client 108a.

The communication client 108a generates a registration message 310. In some embodiments of the present invention, the registration message 310 comprises a packet comprising a SIP Registration message. In an alternative non-limiting embodiment, the registration message 310 comprises the SIP Registration message. The registration message 310 can comprise an indication of an identifier of the communication client 108a, such as the SIP URI 4162223333@serviceprovider.com (i.e. an "identifier"). The registration message 310 can further comprise an indication of a network address of the communication client 108a (ex. a so-called "source address"), which in this non-limiting example can comprise the private IP address of the communication client 108a (i.e. the private IP address 192.168.1.100) and an indication of a source port, which can be a TCP/UDP port value (ex. "5060"). The registration message 310 can further comprise an indication of the network address of the network element 112 (ex. the public IP address 64.230.100.100), i.e. a so-called "destination address". In an alternative non-limiting embodiment of the present invention, the destination address may be omitted from the registration message 310. Within these embodiments of the present invention, the destination address can be populated, for example, by the home gateway 110a as part of compiling a registration message 312 to be described below or by another entity. In further alternative non-limiting embodiments of the present invention, the identifier of the communication client 108a can be omitted from the registration message 310. Within these embodiments of the present invention, the identifier of the communication client 108a can be populated, for example, by the home gateway 110a as part of compiling a registration message 312 to be described below or by another entity. The communication client 108a then sends the registration message 310 towards the home gateway 110a via the local data network 110, using for example, SIP protocol.

The home gateway 110a receives the registration message 310 and compiles the registration message 312 by augmenting data received as part of the registration message 310. To that end, the home gateway 110a creates the registration message 312 by replacing the value in the received source address by its own public IP address, which in this non-limiting example can comprise the public IP address of the home gateway 110a (i.e. the public IP address "64.230.200.100"). The home gateway 110a further substitutes the value of the received source port with the source port number of the home gateway 110a associated with the communication client 108a (ex. "$110a_1$"). The home gateway 110a then sends the registration message 312 towards the network element 112 via the access device 106 and the data network 104.

When the network element 112 receives the registration message 312, it examines its content. It retrieves the identifier of the communication client 108a from the registration message 312 and generates the identifier 202 of the record 200a. It then retrieves the source address and populates the address 204. Using the data received as part of the source port, the network element 112 generates the sub-address 206. Accordingly, the network element 112 is operable to generate the aforementioned record 200a with the information received as part of the registration message 312. If the network element 112 determines that the record 200a associated with the communication client 108a already exists (i.e. an old record 200a), the network element 112 can delete the old record 200a and populate a new record 200a with the identifier 202, the address 204 and the sub-address 206 received as part of the registration message 312. Alternatively, the network element 112 can modify a portion of the old record 200a to derive the new record 200a.

In substantially the same manner, the communication clients 108b and 108c can generate and transmit registration messages similar to the registration messages 310 to enable the network element 112 to populate records 200b, 200c respectively. The communication client 116 can generate a registration message similar to the registration message 312 with a default port number as the sub-address 206 to enable the network element 112 to populate the record 200d.

It should be noted that in alternative non-limiting embodiments of the present invention, where the home gateway 110a is not SIP-aware, the home gateway 110a may perform NAT operation on an IP packet encapsulating the SIP registration request. Within these embodiments, the home gateway 110a amends information maintained within the IP packet encapsulating the SIP registration request and leaves the SIP registration request intact.

Several non-limiting embodiments as to how the auxiliary identifier 208 can be populated are contemplated. In a first non-limiting embodiment of the present invention, the network element 112 can generate the auxiliary identifier 208 during execution of the registration process. For example, in some embodiments of the present invention, each of the communication clients 108a, 108b, 108c can be aware of its respective auxiliary identifier and they can transmit an indication of their respective auxiliary identifier as part of the above-described registration process. Within these non-limiting embodiments of the present invention, the user 101a may provision indications of auxiliary identifiers for a respective one of the communication clients 108a, 108b, 108c by using the respective one of the communication clients 108a, 108b, 108c. Within some of these embodiments, the user 101a would need to trigger the respective one of the communication clients 108a, 108b, 108c to enter into auxiliary identifier provisioning mode, for example, by clicking a soft key or a pre-determined sequence of digits. In an alternative non-limiting embodiment of the present invention, the home gateway 110a can be aware of the respective auxiliary identifiers of each of the communication clients 108a, 108b, 108c. Within these embodiments of the present invention, the home gateway 110a can provide an indication of the auxiliary identifier when generating the respective registration message 312.

In alternative non-limiting embodiments of the present invention, the user 101a may provision indications of auxiliary identifiers at any time after the registration process, for example, by interacting with a web site or a web portal, an IVR system, a service representative, etc. Within these embodiments of the present invention, the network element 112 may populate the auxiliary identifier 208 when the user 101a (or the user 101b) provides an initial indication or makes changes to the indication of the auxiliary identifier 208.

The network element 112 may maintain or have access to a number of additional databases. For example, the network element 112 may comprise or have access to a customer account database, which among other data, may correlate a given SIP URI with a registered subscriber name. In an alternative non-limiting embodiment of the present invention, the customer account database may be integrated with the client mapping 200. Within these embodiments of the present invention, records of the client mapping 200 may further store a registered subscriber name.

It should be understood that several components of the infrastructure of FIG. 1 can be omitted, configured differently or substituted by alternative components. A non-limiting example of one possible alternative of the infrastructure of FIG. 1 will now be described. In the specific non-limiting embodiment depicted in FIG. 1, the communication clients 108a, 108b and 108c are all registered to the same user 101a (i.e. all of the communication clients 108a, 108b and 108c are associated with the same identifier 202) and are all located at the customer premises 102. However, in an alternative non-limiting embodiment of the present invention, the communication clients 108a, 108b and 108c may be registered to the same user 101a (i.e. be associated with the same identifier 202), but may not be necessarily all located at the customer premises 102. For example, the communication client 108c may comprise a wireless VoIP phone and, as such, may not be physically located at the customer premises 102 all the time. As another example, the communication client 108b may be a VoIP phone located at a cottage (not depicted), but nevertheless may still be registered to the same user account associated with the user 101a. Accordingly, it should be understood that, broadly speaking, the communication clients 108a, 108b and 108c are associated with the user 101a not by virtue of being in the same location (ex. the customer premises 102), but rather being registered to a single user account (ex. the user account associated with the user 101a). It should be further understood that within these non-limiting alternative embodiments, the various communication clients associated with the same user account will all have the same "user account information" (or another identifier) stored within identifier 202 of the client mapping 200, but may have different network addresses stored within the address 204 and sub-address 206.

Within yet further non-limiting embodiments of the present invention, some of the communication clients 108a, 108b, 108c can be coupled to a first communication network (such as, for example, the data network 104) and others of the communication clients 108a, 108b, 108c can be coupled to a second communication network (such as for example, another network substantially similar to the data network 104, a wireless communication network, etc.). Within these non-limiting embodiments of the present invention, irrespective of whether the given one of the communication clients 108a, 108b, 108c is coupled to the first or the second communication networks, the given one of the communication clients 108a, 108b, 108c logs in with the same user account and, as such, is associated with the same user account.

Figure 4:
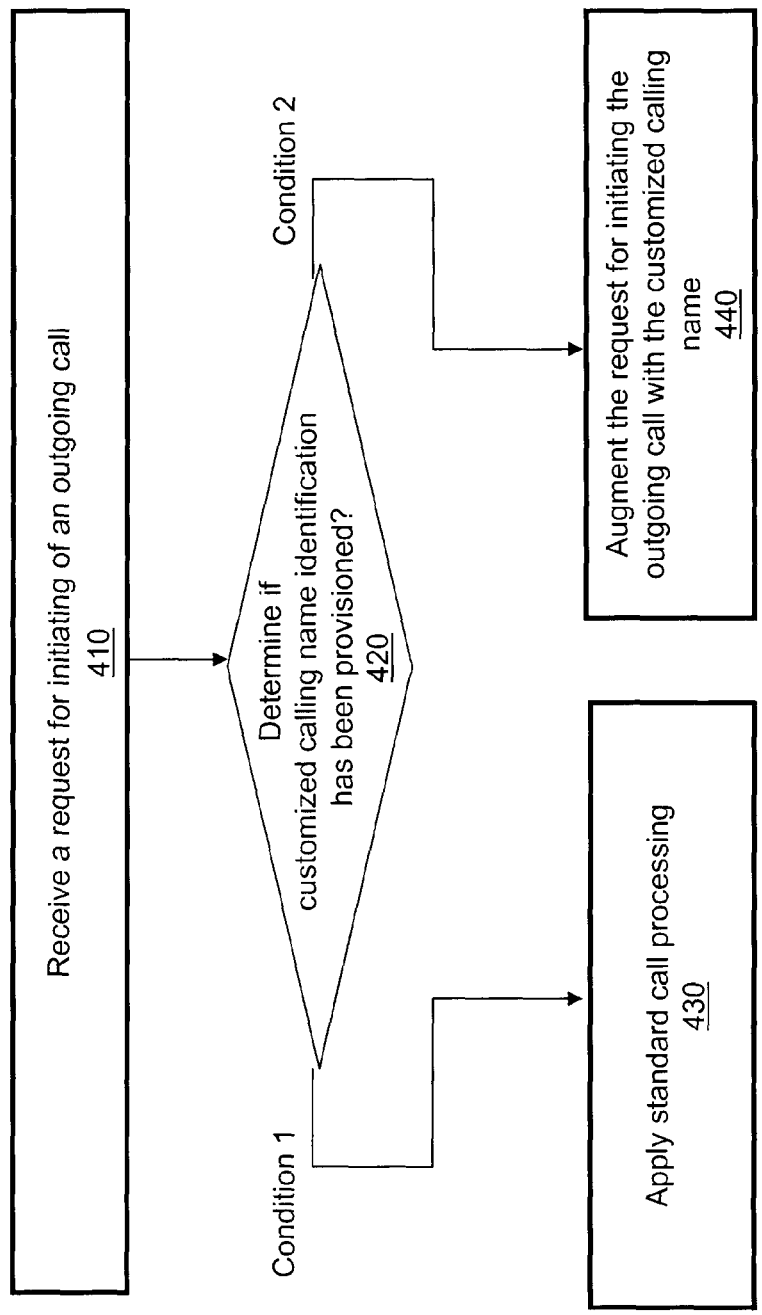
FIG. 4 is a flow chart representing a non-limiting embodiment of a method for providing customized calling name identification within the infrastructure of FIG. 1.

Given the infrastructure of FIG. 1, it is possible to execute a method for providing customized calling name identification. With reference to FIG. 4, a non-limiting embodiment of a method for providing customized calling name identification will be described. An example non-limiting embodiment of the method will be described in the context of the following non-limiting assumptions:

the auxiliary identifiers 208 of the records 200a, 200b, 200c have been provisioned as has been described above with reference to FIG. 2.

the network element 112 and the communication clients 108a, 108b, 108c, 116 implement SIP protocol and, as such, an outgoing call originated, for example, by one of the communication clients 108a, 108b, 108c is identified at least in part by the SIP URI associated with the communication clients 108a, 108b, 108c (i.e. 4162223333@serviceprovider.com).

The following two scenarios will be used for illustration purposes:

Scenario A Within this scenario it is assumed that the user 101b is using the communication client 108b to establish the outgoing call destined to the communication client 116.

Scenario B Within this scenario it is assumed that the user 101b is using the communication client 108a to establish the outgoing call destined to the communication client 116.

Figure 5:
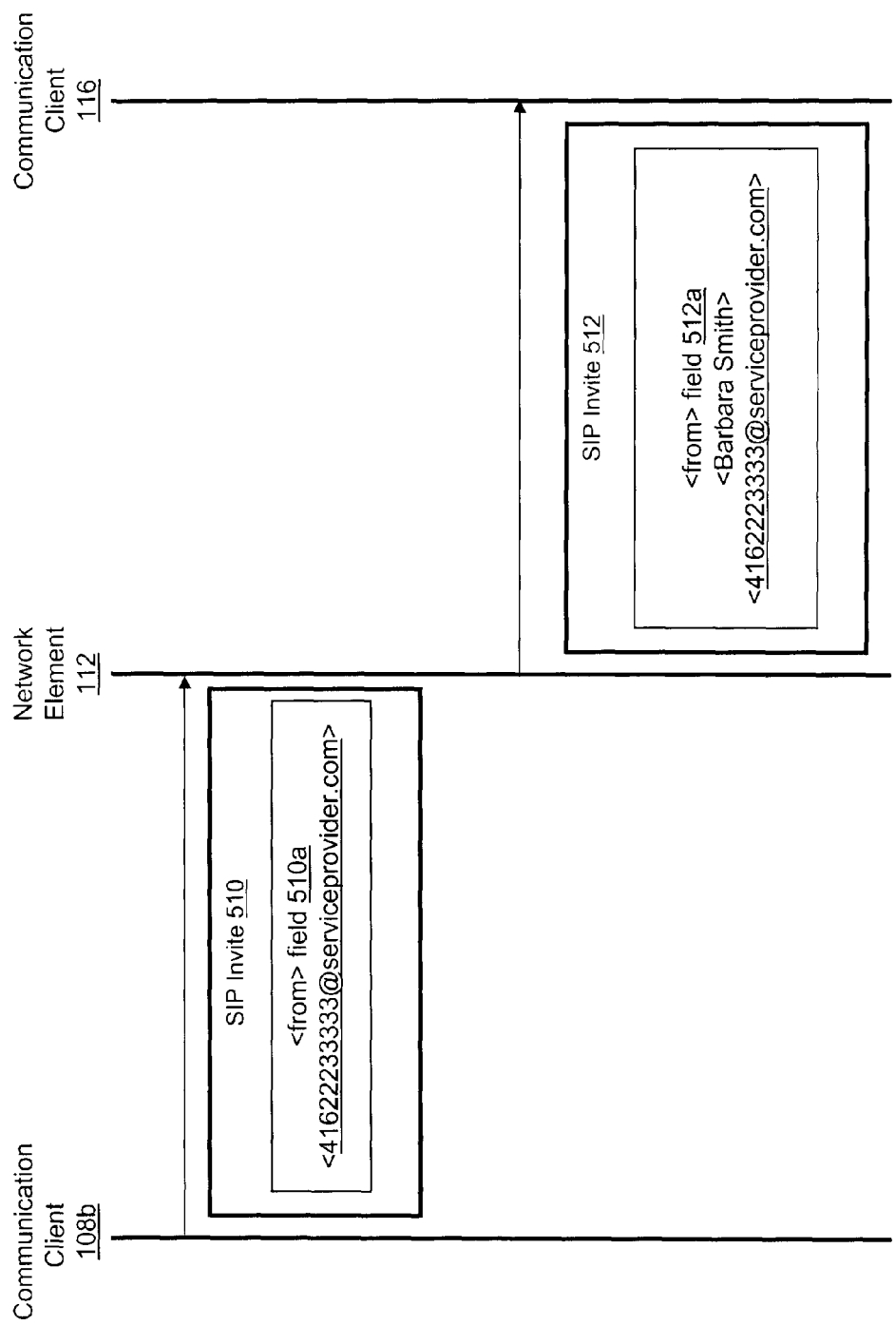
FIG. 5 is a signal flow diagram depicting a flow of signals between various components of the infrastructure of FIG. 1 exchanged during execution of the method of FIG. 4 within a first non-limiting scenario.
Figure 6:
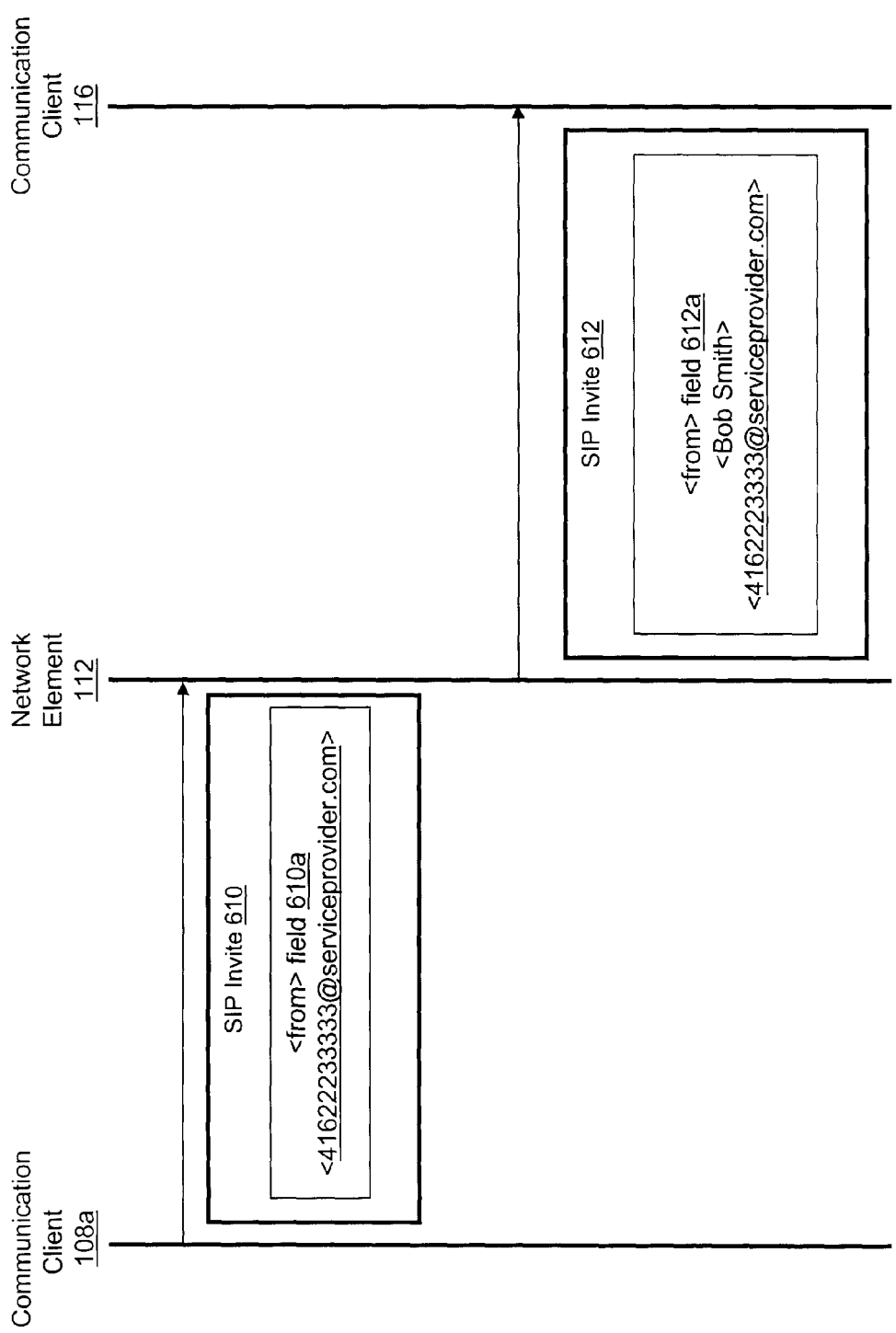
FIG. 6 is a signal flow diagram depicting a flow of signals between various components of the infrastructure of FIG. 1 exchanged during execution of the method of FIG. 4 within a second non-limiting scenario.

The description of the method of FIG. 4 will be illustrated with signal flow diagrams of FIG. 5 and FIG. 6. FIG. 5 depicts a signal flow exchanged between components of the infrastructure of FIG. 1 within Scenario A. FIG. 6 depicts a signal flow exchanged between components of the infrastructure of FIG. 1 within Scenario B.

Step 410

The method begins at step 410, where a request for initiating of an outgoing call is received by the network element 112. Step 410 can be executed, for example, in response to a user of a communication client (such as, for example, one of the communication clients 108a, 108b, 108c) dialling a destination number using the communication client (such as, for example, one of the communication clients 108a, 108b, 108c).

Scenario A Within this scenario, the user 101b inputs a telephone number associated with a desired destination party into the communication client 108b (ex. a number representative of the SIP URI associated with the communication client 116, such as, 4165556666@serviceprovider.com or a portion thereof, such as, for example, 4165556666, in which case an indication of the domain can be transmitted separately, added by the home gateway 110a or by the network element 112). Naturally, the user 101b can select the telephone number associated with the desired destination party from an address book, by selecting a link, by pushing a click-to-call button and the like. In response to the user inputting the telephone number associated with the desired destination party and, potentially, pressing a "SEND" soft key, the communication client 108b generates a SIP INVITE message 510 of FIG. 5. It should be expressly understood that in alternative embodiments of the present invention, another type of signalling message can be generated (ex. Simple Object Access Protocol (SOAP), ITU-T's H.323 signalling protocol, UNISTIM, MiTAI, Skiny, etc.).

The SIP INVITE message 510 comprises inter alia a <from> field 510a, which comprises an indication of the SIP URI of the communication client 108b (i.e. 4162223333@serviceprovider.com).

In some embodiments of the present invention, the network element 112 determines a registered subscriber name associated with the SIP URI received within the <from> field 510a, which in this example is the name of the user 101a, who is the subscriber to the telephony services at the customer premises 102 (i.e. <Barbara Smith>). For example, the network element 112 can access the aforementioned customer account database (or another database) to ascertain that the registered subscriber name associated with the SIP URI received within the <from> field 510a comprises <Barbara Smith>. In an alternative non-limiting embodiment of the present invention, the network element 112 may determine the registered subscriber name by performing a look up into a LIDB (not depicted), such as, for example, by transmitting a TCAP query via a gateway and the like. In an alternative non-limiting embodiment of the present invention, the <from> field 510a (or another field within the SIP INVITE 510) may further comprise an indication of the registered subscriber name or a portion thereof.

The SIP INVITE message 510 (or a packet encapsulating the SIP INVITE message 510) further comprises an indication of the communication client that has originated the SIP INVITE message 510, for example in the form of the above-mentioned public IP address of the home gateway 110a and the port number with the communication client 108b (not separately depicted in FIG. 5).

Scenario B Within this scenario, the user 101b inputs a telephone number associated with a desired destination party into the communication client 108a (ex. a number representative of the SIP URI associated with the communication client 116, such as, 4165556666@serviceprovider.com or a portion thereof, such as, for example, 4165556666, in which case an indication of the domain can be transmitted separately, added by the home gateway 110a or by the network element 112). In response to the user inputting the telephone number associated with the desired destination party and, potentially, pressing a "SEND" soft key, the communication client 108a generates a SIP INVITE message 610 of FIG. 6. It should be expressly understood that in alternative embodiments of the present invention, another type of signalling message can be generated (ex. Simple Object Access Protocol (SOAP), ITU-T's H.323 signalling protocol, UNISTIM, MiTAI, Skiny, etc.).

The SIP INVITE message 610 comprises inter alia a <from> field 610a, which comprises an indication of the SIP URI of the communication client 108a (i.e. 4162223333@serviceprovider.com).

In some embodiments of the present invention, the network element 112 determines a registered subscriber name associated with the SIP URI within the <from> field 610a, which in this example is the name of the user 101a, who is the subscriber to the telephony services at the customer premises 102 (i.e. <Barbara Smith>). For example, the network element 112 can access the aforementioned customer account database (or another database) to ascertain that the registered subscriber name associated with the SIP URI received within the <from> field 610a comprises <Barbara Smith>. In an alternative non-limiting embodiment of the present invention, the network element 112 may determine the registered subscriber name by performing a look up into a LIDB (not depicted), such as, for example, by transmitting a TCAP query via a gateway and the like. In an alternative non-limiting embodiment of the present invention, the <from> field 610a (or another field within the SIP INVITE 610) may further comprise an indication of the registered subscriber name or a portion thereof.

The SIP INVITE message 610 (or a packet encapsulating the SIP INVITE message 610) further comprises an indication of the communication client that has originated the SIP INVITE message 610, for example in the form of the above-mentioned public IP address of the home gateway 110a and the port number associated with the communication client 108a (not separately depicted in FIG. 6).

Step 420

Next, at step 420, the network element 112 determines if a customized calling name has been provisioned in association with the communication client that initiated the outgoing call at step 410.

It will be recalled that as part of the signalling message received as part of step 410 (ex. the aforementioned SIP INVITE message 510 or SIP INVITE message 610), the network element 112 has become aware of the public IP address of the home gateway 110a and the port number associated with the communication client that initiated the outgoing call at step 410. The network element 112 accesses the client mapping 200 and performs a look up of the address 204 and the sub-address 206 that match the values received as part of step 410.

Scenario A The network element 112 determines that record 200b is associated with the communication client that has initiated the outgoing call at step 410 (i.e. communication client 108b). The network element 112 examines the auxiliary identifier 208 of the record 200b to determine if it has been provisioned with any value.

Scenario B The network element 112 determines that record 200a is associated with the communication client that has initiated the outgoing call at step 410 (i.e. communication client 108a). The network element 112 examines the auxiliary identifier 208 of the record 200a to determine if it has been provisioned with any value.

Step 430

If the network element 112 determines that the auxiliary identifier 208 has not been provisioned or if it comprises <default> (i.e. "Condition 1" branch of step 420), the network element 112 executes step 430. At step 430, the network element provides standard call processing. For example, the network element 112 can transmit a SIP INVITE message to the destination party (i.e. the communication client 116), the SIP INVITE message transmitted to the destination party comprising an indication of the registered subscriber name.

Scenario A Within this scenario, the network element 112 determines that the auxiliary identifier 208 the record 200b comprises <default>. The network element 112, accordingly, provides standard call processing.

In those embodiments of the present invention, where the <from> field 510a does not contain an indication of the registered subscriber name and the network element 112 determines the registered subscriber name based on the SIP URI received as part of the <from> field 510a, the network element 112 generates a SIP INVITE message 512, which contains substantially similar information as the SIP INVITE message 510, but further includes the so-determined indication of the registered subscriber name. The network element 112 then transmits the SIP INVITE message 512 towards the communication client 116. The SIP INVITE message 512, therefore, can be said to include an augmented calling party name identifier.

In an alternative non-limiting embodiment of the present invention, where the <from> field 510a comprises the indication of the registered subscriber name, the network elements 112 transmits the SIP INVITE message 512, which contains data substantially similar to the data received as part of the SIP INVITE message 510.

Step 440

If, on the other hand, the network element 112 determines that the auxiliary identifier 208 has been provisioned (i.e. "Condition 2" branch of step 420), the network element 112 executes step 440. At step 440, the network element 112 augments a portion of the <from> field of the SIP INVITE message received as part of step 410 with the data maintained within the auxiliary identifier 208.

In those embodiments of the present invention, where the <from> field 510a does not contain an indication of the registered subscriber name and the network element 112 determines the registered subscriber name based on the SIP URI received as part of the <from> field 510a, the network element 112 can perform one of the following actions:

in a first non-limiting example, the network element 112 can substitute the so-determined registered subscriber name with the data maintained within the auxiliary identifier 208;

in a second non-limiting example, the network element 112 can substitute a portion of the so-determined registered subscriber name with the data maintained within the auxiliary identifier 208;

in a third non-limiting example, the network element 112 can keep the so-determined registered subscriber name and augment it with the data maintained within the auxiliary identifier 208.

In an alternative non-limiting embodiment of the present invention, if the network element 112 determines that the customized calling name identification has been provisioned, it may omit performing the look up of the registered subscriber name altogether.

In alternative non-limiting embodiments of the present invention, where the <from> field 510a comprises the indication of the registered subscriber name, the network element 112 can substitute a portion of the <from> field of the SIP INVITE message received as part of step 410 with the data maintained within the auxiliary identifier 208. In alternative non-limiting embodiments of the present invention, the network element 112 may insert the data maintained within the auxiliary identifier 208 in addition to the data maintained within the <from> field of the SIP INVITE message received as part of step 410. In yet further non-limiting embodiments of the present invention, the network element 112 can substitute entirety of the <from> field of the signalling message received as part of step 410 with the data maintained within the auxiliary identifier 208.

Scenario B In the embodiment being presented herein, the network element 112 may substitute the so-determined registered subscriber name (i.e. <Barbara Smith>) with the data maintained within the auxiliary identifier 208 (i.e. <Bob Smith>).

In an alternative non-limiting embodiment of the present invention, which would be particularly applicable where the <from> field 610a comprises the indication of the registered subscriber name, the network element 112 first determines a portion of the <from> field 610a that contains the registered subscriber name. In some embodiments, this can be performed based on specific syntaxes used to populate the <from> field 610a in the first place. For example, the portion of the <from> field 610a representing the registered subscriber name can be delimited using specific syntaxes, such as, for example, single inverted commas, double quotes or any other suitable set of strings. In another non-limiting embodiment of the present invention, the portion representative of the registered subscriber name can be maintained in a separate field from the <from> field 610a (for example, in a separate <registered subscriber name> field). Within these non-limiting embodiments of the present invention, the <from> field 610a would only maintain an indication of SIP URI. The network element 112 then deletes the indication of the registered subscriber name and substitutes it with the information maintained within the auxiliary identifier 208. Within this specific non-limiting example, the network element 112 removes <Barbara Smith> and replaced it with <Bob Smith>.

The network element 112 then sends a SIP INVITE message 612 towards the communication client 116. The SIP INVITE message 612 is substantially similar to the SIP INVITE message 610, but for the substitution of the registered subscriber name for the information maintained within the auxiliary identifier 208. The SIP INVITE message 612, therefore, can be said to include an augmented calling party name identifier.

In some embodiments of the present invention, which are particularly applicable where the outgoing call is destined to a communication device coupled to a communication network other than the data network 104, the network element 112 can transmit the SIP INVITE message 610 to a media gateway (not depicted) responsible for mediating communications between the data network 104 and the other communication network.

As the result of the method described above, within this scenario, the destination party at the communication client 116 will be able to ascertain the true identity of the person who originated the call (i.e. Bob Smith) and not the person who is the registered subscriber (i.e. not Barbara Smith).

In an alternative non-limiting embodiment of the present invention, where the auxiliary identifier 208 comprises privacy-related information, the method described above would allow the user (such as one of the users 101a, 101b, for example) to prevent the called party from ascertaining the name of the calling party, if the need be. In yet further embodiments, which are particularly applicable where the auxiliary identifier 208 comprises an alternative telephone number, the user (such as one of the users 101a, 101b, for example) can provide an alternative number in addition to the telephone number of the originating communication client or instead of the telephone number of the originating communication client. It should be expressly understood that these non-limiting benefits need not be realized in every embodiment of the present invention.

An Optional Enhancement

In some non-limiting embodiments of the present invention, the user 101a or the user 101b may choose to provision more than one indication of the auxiliary identifier 208 for a given communication client. For example, the users 101a, 101b may choose to provide three indications of the auxiliary identifier 208 in association with the communication client 108b. These three indications of the auxiliary identifier 208 may, for example, comprise "Barbara Smith", "Bob Smith" and "Medical Office of Barbara Smith, MD" representing names of two users who can potentially originate outgoing calls using the communication client 108b, as well as the location of the communication client 108b. For the purposes of the example to be presented herein below, it is assumed that the user 101a is desirous of initiating an outgoing call using the communication client 108b. It is further assumed that the auxiliary identifier 208 of the record 200b has been provisioned as follows:

<Barbara Smith>
<Bob Smith>
<Medical Office of Barbara Smith, MD>

Within these non-limiting embodiments of the present invention, execution of the step 440 described above can be augmented as follows. The network element 112 may inform the user 101a that three customized calling name identifications have been provisioned. For example, the network element 112 can present an audio message, a text message or a combined audio/text message announcing to the user 101a that three customized calling name identifications have been provisioned. In an alternative non-limiting embodiment of the present invention, the audio, text or combination message may be presented to the user 101a via another suitable means (such as, for example, via a cell phone, via an instant messaging application, a pop-up window in a computing apparatus and the like). For example, the network element 112 can transmit an SMS message to a cell phone and to receive a response SMS message from the cell phone indicative of which customized calling name identifications are to be used.

The network element 112 may further solicit an indication from the user 101a which one of the customized calling name identifications the user 101a is desirous of using for the specific outgoing call. The network element 112 then augments the signalling information with one of the provisioned customized calling name indications as per indication received from the user 101a.

Figure 7:
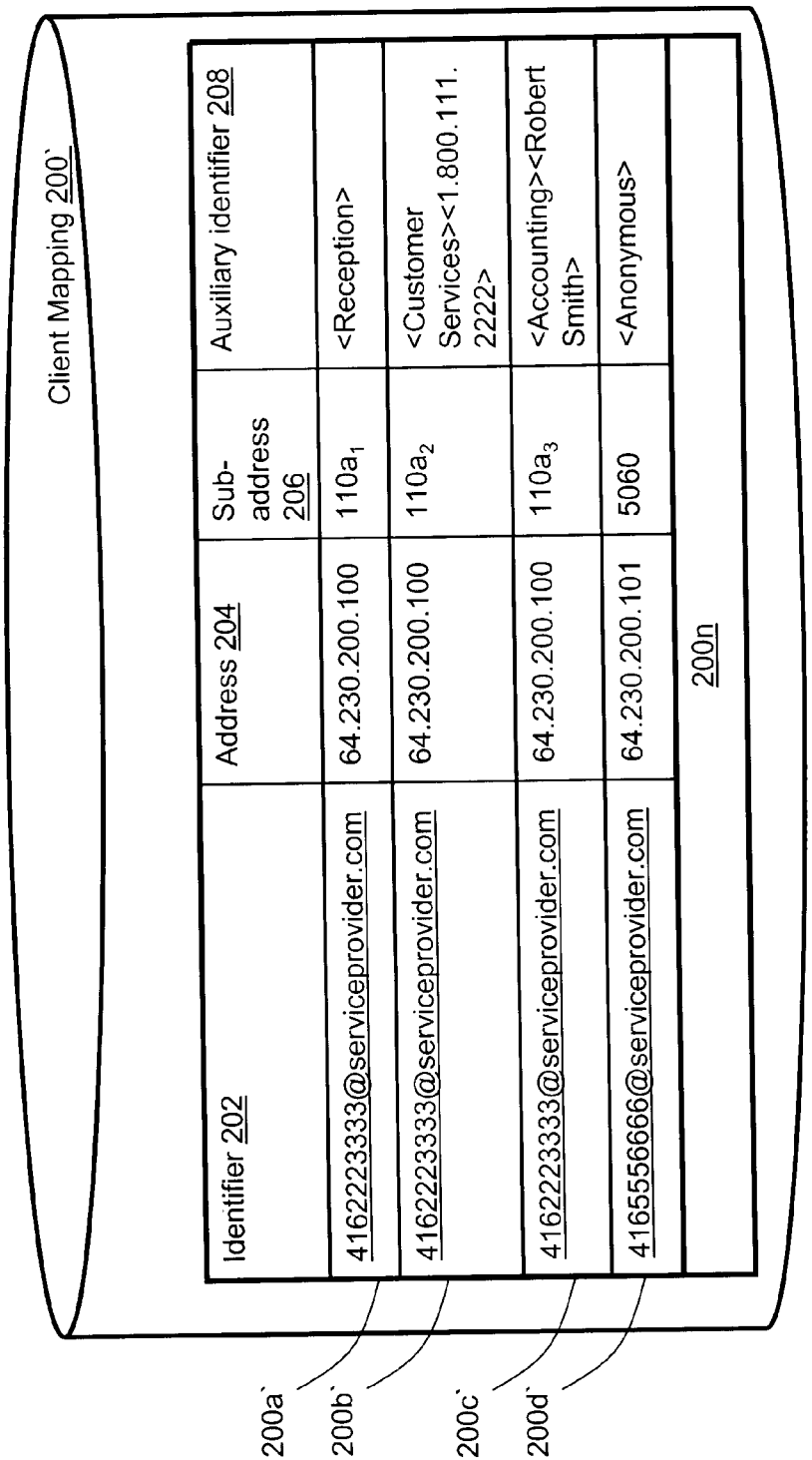
FIG. 7 is a diagram representing another non-limiting embodiment of the client mapping maintained by the network element of FIG. 1.

Even though the foregoing description has focused primarily on non-limiting examples of the customer premises 102 comprising a residence, one should appreciate that teachings presented herein are not limited to the residential environment. As a non-limiting illustration consider the following scenario. Reference is now made to FIG. 7, which depicts a non-limiting embodiment of a client mapping 200'. The client mapping 200' is substantially similar to the client mapping 200 and, as such, like elements are depicted with like numerals.

Within the non-limiting scenario to be presented with reference to FIG. 7, it is assumed that the customer premises 102 comprises an office associated with a company "XYZ Limited". XYZ Limited subscribes to the communication services at the customer premises 102 and, as such, the registered subscriber name associated with the SIP URI 4162223333@serviceprovider.com (and, accordingly, the communication clients 108a, 108b, 108c) comprises "XYZ Limited". The communication clients 108a, 108b, 108c are located within the customer premises 102. The communication client 108a can be associated with an auxiliary identifier <Reception>, the communication client 108b can be associated with an auxiliary identifier <Customer Services><1.800.111.2222> and the auxiliary identifier associated with the communication client 108c can comprise <Accounting>. The communication client 116 can be located in another office associated, for example, with a company "ABC Limited". ABC Limited subscribes to the communication services at a location where the communication client 116 is located. As such, the registered subscriber name associated with the SIP URI 4165556666@serviceprovider.com (and, accordingly, the communication client 116) can comprise "ABC Limited". The communication client 116 can be associated with an auxiliary identifier <Anonymous>. For the purposes of the discussion to be presented herein below, it is assumed that records 200a', 200b', 200c', 200d' of the client mapping 200' have been provisioned accordingly.

Given that the client mapping 200' has been populated as depicted in FIG. 7 and during execution of various embodiments of the methods described above, the following call processing is envisioned, when a given communication client originates an outgoing call:

Communication client 108a (i) in a first non-limiting scenario of the present invention, the network element 112 can augment the received SIP INVITE message (or another type of signalling message) by inserting an indication of the auxiliary identifier to generate an augmented calling party name identifier, which in this example can comprise "4162223333. XYZ Limited. Reception";

(ii) in a second non-limiting scenario, the network element 112 can augment the received SIP INVITE message (or another type of signalling message) by substituting a portion of the received SIP INVITE message, for example, by substituting the originating party telephone number, which would result in an augmented calling party name identifier as follows: "XYZ Limited. Reception".

(iii) in a third non-limiting scenario, the network element 112 can augment the received signalling message by substituting the entirety of the <from> field of the signalling message to generate an augmented calling party name identifier, which would comprise "Reception".

Naturally, numerous further alternatives are possible.

Communication client 108b The network element 112 can augment the received SIP INVITE message (or another type of signalling message) by substituting a portion of the received SIP INVITE message (or another type of signalling message), for example, by (i) substituting the originating party telephone number, which would result in an augmented calling party name identifier as follows: "1.800.111.2222. XYZ Limited. Customer services";

(ii) substituting either just the originating party telephone number or just the calling party name, resulting respectively in the augmented calling party identifier as follows "1.800.111.2222. XYZ Limited" and "4162223333. Customer services".

Naturally, numerous further alternatives are possible.

Communication client 108c (i) in a first non-limiting scenario of the present invention, the network element 112 can augment the received SIP INVITE message (or another type of signalling message) by inserting an indication of the auxiliary identifier (or a portion thereof) to generate an augmented calling party name identifier, which in this example can comprise, for example, "4162223333. XYZ Limited. Accounting. Robert Smith", "4162223333. XYZ Limited. Accounting" or "4162223333. XYZ Limited. Robert Smith".

(ii) in a second non-limiting scenario, the network element 112 can augment the received SIP INVITE message (or another type of signalling message) by substituting a portion of the received SIP INVITE message (or another type of signalling message), for example, by substituting the originating party telephone number, which would result in an augmented calling party name identifier, for example, as follows: "XYZ Limited. Accounting. Robert Smith", "XYZ Limited. Accounting" or "XYZ Limited. Robert Smith".

(iii) in a third non-limiting scenario, the network element 112 can augment the received SIP INVITE message (or another type of signalling message) by substituting the entirety of the <from> field of the received signalling message to generate an augmented calling party name identifier, which would comprise "Accounting. Robert Smith".

Communication client 116 Within some embodiments of the present invention, the network element 112 can augment the received SIP INVITE message (or another type of signalling message). For example, the network element 112 can augment a portion or entirety of the <from> field of the received signalling message to generate an augmented calling party name identifier, which in this case would comprise "Anonymous", effectively preventing the called party from ascertaining the identity of the caller who uses the communication client 115.

It should be expressly understood that teachings of this invention are not limited to voice-over-packet or VoIP communication sessions and one skilled in the art can easily adapt the teachings presented herein to other protocols for handling media-over-a-network communications.

Those skilled in the art will appreciate that certain functionality of the network element 112 and/or other elements of the infrastructure described herein may be implemented as pre-programmed hardware or firmware elements (e.g., application specific integrated circuits (ASICs), electrically erasable programmable read-only memories (EEPROMs), etc.), or other related components. In other embodiments, certain portions of the network element 112 and/or other elements may be implemented as an arithmetic and logic unit (ALU) having access to a code memory (not shown) which stores program instructions for the operation of the ALU. The program instructions could be stored on a medium which is fixed, tangible and readable directly by the network element 112 and/or other elements, (e.g., removable diskette, CD-ROM, ROM, fixed disk, USB drive), or the program instructions could be stored remotely but transmittable to the network element 112 and/or other elements via a modem or other interface device.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A method comprising:
receiving at a network computing element a request for initiating an outgoing call from a call-originating communication client, said call-originating communication client being registered in association with a network address and being associated with a call-originating communication client identifier, said request comprising a calling party identification portion comprising an indication of said network address;
determining a registered subscriber name based on said network address;
based on said call-originating communication client identifier, determining an auxiliary identifier associated with said call-originating communication client;
augmenting at the network computing element said calling party identification portion of said request with said auxiliary identifier to generate an augmented request, wherein said augmenting comprises substituting at least a portion of said registered subscriber name with said auxiliary identifier to generate an augmented registered subscriber name and inserting said augmented registered subscriber name into said calling party identification portion.

2. The method defined in claim 1, said outgoing call destined for a destination communication client, the method further comprising:
transmitting said augmented request to said destination communication client, said augmented request for causing said destination communication client to convey said auxiliary identifier.

3. The method defined in claim 2, said call-originating communication client being coupled to a first communication network and said destination communication client being coupled to a second communication network; wherein said transmitting said augmented request comprises transmitting said augmented request to a gateway responsible for mediating communication between said first and second communication networks.

4. The method defined in claim 1, wherein said receiving a request comprises receiving a SIP message from said call-originating communication client.

5. The method defined in claim 4, wherein said network address comprises a SIP URI.

6. The method defined in claim 1, wherein said call-originating communication client identifier comprises at least one of:
an IP address associated with said call-originating communication client;
a MAC address associated with said call-originating communication client;
a proprietary call-originating communication client identifier associated with said call-originating communication client; and
an IP address associated with an access device connected to said call-originating communication client and a port identifier of said access device associated with said call-originating communication client.

7. The method defined in claim 1, wherein said determining comprises:
extracting a call-originating communication client identifier of said call-originating communication client from said request;

accessing a database comprising at least one record mapping a specific communication client identifier with at least one corresponding auxiliary identifier;

retrieving said at least one corresponding auxiliary identifier from said at least one record, if said specific communication client identifier corresponds to said call-originating communication client identifier of said communication client.

8. The method defined in claim 1, wherein said augmenting comprises substituting all of said calling party identification portion with said auxiliary identifier.

9. The method defined in claim 1, wherein said determining an auxiliary identifier associated with said call-originating communication client comprises determining a first auxiliary identifier and a second auxiliary identifier associated with said call-originating communication client, and wherein the method further comprises:

soliciting from said call-originating communication client an indication of which one of said first and second auxiliary identifiers is to be used;

receiving said indication; and wherein said augmenting comprises; augmenting said calling party identification portion of said request with one of said first and second auxiliary identifiers based on said indication of which one of said first and second auxiliary identifiers is to be used.

10. The method defined in claim 1, wherein the auxiliary identifier comprises information that identifies one of:

an originator of the outgoing call from the call-originating communication client; and a location of the call-originating communication client.

11. The method of claim 1, wherein the call-originating communication client is one of a plurality of communication clients, wherein each of the plurality of communication clients is registered in association with the network address.

12. A network computing element configured to:

receive a request for initiating an outgoing call from a call-originating communication client, said call-originating communication client being registered in association with a network address and being associated with a call-originating communication client identifier, said request comprising a calling party identification portion comprising an indication of said network address;

determine a registered subscriber name based on said network address;

determine an auxiliary identifier associated with said call-originating communication client based on said call-originating communication client identifier;

augment said calling party identification portion of said request for initiating an outgoing call with said auxiliary identifier to generate an augmented request, wherein said augmenting comprises substituting at least a portion of said registered subscriber name with said auxiliary identifier to generate an augmented registered subscriber name and inserting said augmented registered subscriber name into said calling party identification portion.

13. The network computing element defined in claim 12, further configured to:

transmit said augmented request to a destination communications client for which said request was destined for, said augmented request for causing said destination communication client to convey said auxiliary identifier.

14. The network computing element defined in claim 12, embodied in a soft switch.

15. The apparatus defined in claim 12, wherein the auxiliary identifier comprises information that identifies one of:

an originator of the outgoing call from the call-originating communication client; and a location of the call-originating communication client.

16. The network computing element of claim 12, wherein the call-originating communication client is one of a plurality of communication clients, wherein each of the plurality of communication clients is registered in association with the network address.

17. A system comprising:

a network element operable:

to receive a request for initiating an outgoing call from a call-originating communication client, said call-originating communication client being registered in association with a network address and being associated with a call-originating communication client identifier, said request comprising a calling party identification portion comprising an indication of said network address;

determine a registered subscriber name based on said network address;

based on said call-originating communication client identifier, to determine an auxiliary identifier associated with said call-originating communication client;

to augment said calling party identification portion of said request for initiating an outgoing call with said auxiliary identifier to generate an augmented request, wherein said augmenting comprises substituting at least a portion of said registered subscriber name with said auxiliary identifier to generate an augmented registered subscriber name and inserting said augmented registered subscriber name into said calling party identification portion.

18. The system defined in claim 17, wherein said network element is further operable to transmit such augmented request to a destination communication client for which said request was destined for.

19. The system defined in claim 18, further comprising said destination communication client; and wherein said destination communication client is operable, responsive to receiving said augmented request, to convey said auxiliary identifier.

20. The system defined in claim 17, further comprising a first communication network associated with said call-originating communication client and a second communication network associated with said destination communication client, wherein said network element is further operable to:

transmit said augmented request to a gateway responsible for mediating communications between said first and second communication networks.

21. The system defined in claim 17, wherein to receive a request, the network element is operable to receive a SIP message from said call-originating communication client.

22. The system defined in claim 21, further comprising said call-originating communication client, wherein said call-originating communication client is operable to generate said SIP message in response to a user:

inputting a destination network identifier;

inputting a destination network identifier and selecting a pre-defined soft key;

inputting a destination network identifier and selecting a pre-defined button;

making a selection from an address book;

selecting a click-to-call button;

selecting a link.

23. The system defined in claim 21, wherein said network address comprises a SIP URI.

24. The system defined in claim 17, further comprising said call-originating communication client, and wherein said call-originating communication client identifier comprises at least one of:
- an IP address associated with said call-originating communication client;
- a MAC address associated with said call-originating communication client;
- a proprietary call-originating communication client identifier associated with said call-originating communication client; and
- an IP address associated with an access drive connected to said call-originating communication client and a port identifier of said access device associated with said call-originating communication client.

25. The system defined in claim 17, wherein to determine an auxiliary identifier, the network element is operable to:
- extract a call-originating communication client identifier of said call-originating communication client from said request;
- access a database comprising at least one record mapping a specific communication client identifier with at least one corresponding auxiliary identifier;
- retrieve said at least one corresponding auxiliary identifier from said at least one record, if said specific communication client identifier corresponds to said call-originating communication client identifier of said call-originating communication client.

26. The system defined in claim 25, wherein said network element comprises said database.

27. The system defined in claim 25, further comprising said database accessible to said network element.

28. The system defined in claim 17, wherein, if the network element determines that said call-originating communication client is associated with a first auxiliary identifier and a second auxiliary identifier, the network element is further operable to:
- solicit from said call-originating communication client an indication of which one of said first and second auxiliary identifiers is to be used;
- receive said indication; and
- wherein to augment said request, the network element is operable to: augment said calling party identification portion of said request with one of said first and second auxiliary identifiers based on said indication of which one of said first and second auxiliary identifiers is to be used.

29. The system defined in claim 17, wherein said auxiliary identifier comprises at least one of:
- an alias associated with a user of said call-originating communication client;
- an indication of a location of said call-originating communication client;
- an alternative call back number;
- an alternative contact address;
- a greeting.

30. The system defined in claim 17, wherein said network element comprises a soft switch.

31. The system defined in claim 17, further comprising said call-originating communication client; and wherein said call-originating communication client comprises one of:
- a VoIP phone;
- a soft client executable on a computing apparatus;
- a POTS phone equipped with an ATA.

32. The system defined in claim 17, wherein the auxiliary identifier comprises information that identifies one of:
- an originator of the outgoing call from the call-originating communication client; and
- a location of the call-originating communication client.

33. The system of claim 17, wherein the call-originating communication client is one of a plurality of communication clients, wherein each of the plurality of communication clients is registered in association with the network address.

34. A non-transitory computer-readable storage medium comprising computer-readable program code which, when executed by a computing apparatus, causes the computing apparatus:
- to receive a request for initiating an outgoing call from a call-originating communication client, said call-originating communication client being registered in association with a network address and being associated with a communication client identifier, said request comprising a calling party identification portion comprising an indication of said network address;
- to determine a registered subscriber name based on said network address;
- based on said call-originating communication client identifier, to determine an auxiliary identifier associated with said call-originating communication client;
- to augment said calling party identification portion of said request for initiating an outgoing call with said auxiliary identifier to generate an augmented request, wherein said augmenting comprises substituting at least a portion of said registered subscriber name with said auxiliary identifier to generate an augmented registered subscriber name and inserting said augmented registered subscriber name into said calling party identification portion.

\* \* \* \* \*